(12) United States Patent
Papac

(10) Patent No.: US 7,510,200 B1
(45) Date of Patent: *Mar. 31, 2009

(54) WHEELCHAIR

(75) Inventor: James B. Papac, Peachtree City, GA (US)

(73) Assignee: PlainSense Wheelchairs, Inc., Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/120,622

(22) Filed: May 3, 2005

Related U.S. Application Data

(60) Continuation of application No. 10/281,431, filed on Oct. 25, 2002, now Pat. No. 6,886,843, and a continuation of application No. 10/026,360, filed on Dec. 18, 2001, now Pat. No. 6,607,250, which is a division of application No. 09/702,928, filed on Oct. 21, 2000, now Pat. No. 6,331,036, which is a division of application No. 09/247,651, filed on Mar. 23, 1999, now Pat. No. 6,139,037, which is a division of application No. 08/684,412, filed on Jul. 23, 1996, now Pat. No. 5,884,928.

(51) Int. Cl.
 *B62M 1/14* (2006.01)
 *A61G 5/02* (2006.01)
(52) U.S. Cl. .................. 280/250.1; 180/907; 280/304.1
(58) Field of Classification Search ............. 280/250.1, 280/304.1, 638, 657; 180/907
See application file for complete search history.

(56) References Cited

U.S. PATENT DOCUMENTS

| | | |
|---|---|---|
| 3,198,576 A | 8/1965 | Rosmarin |
| 3,953,054 A | 4/1976 | Udden et al. |
| 4,046,418 A | 9/1977 | Smith et al. |
| 4,354,791 A | 10/1982 | Antonellis |
| 4,489,955 A | 12/1984 | Hamilton |

(Continued)

FOREIGN PATENT DOCUMENTS

DE 2731952 1/1978

(Continued)

OTHER PUBLICATIONS

Brochure, "Slam'r No Limit", No Limit Designs, Inc,. Fresno, CA (prior to May 8, 2003).
Brochure, "Spectrum Pediatric Wheelchair", Scott Designs, Basic Package (prior to May 8, 2003).

*Primary Examiner*—Paul N. Dickson
*Assistant Examiner*—Marc A Scharich
(74) *Attorney, Agent, or Firm*—Baker Donelson Bearman Caldwell & Berkowitz

(57) ABSTRACT

A wheelchair having a chassis formed from a flat plate folded to define a lower chassis, a chassis back, and an upper chassis. The lower and the upper chassis each have a pair of elongated substantially parallel arms that extend from respective land portions of the chassis. The arms define openings in distal portions for receiving caster wheels. Drive wheels connect to axle mounts that are selectively positioned for track, camber, and height, which axle mounts connect to the chassis back or to the lower chassis for stroller configuration. A seat support attaches to the upper chassis for supporting a person and includes independently adjustable height, longitudinal position relative to a seat back, and angle. A pair of push handles attach to the chassis back.

28 Claims, 7 Drawing Sheets

U.S. PATENT DOCUMENTS

| | | | |
|---|---|---|---|
| 4,500,102 A | 2/1985 | Haury et al. |
| 4,555,121 A | 11/1985 | Lockard et al. |
| 4,570,756 A | 2/1986 | Minnebraker et al. |
| 4,592,562 A | 6/1986 | Strautnieks et al. |
| 4,592,570 A | 6/1986 | Nassiri |
| 4,625,984 A | 12/1986 | Kitrell |
| 4,647,066 A | 3/1987 | Walton |
| 4,648,615 A | 3/1987 | Volin |
| 4,655,471 A | 4/1987 | Peek |
| 4,693,490 A | 9/1987 | Loodberg et al. |
| 4,753,482 A | 6/1988 | Warren |
| 4,765,684 A | 8/1988 | Kvalheim et al. |
| 4,768,797 A | 9/1988 | Friedrich |
| 4,955,624 A | 9/1990 | Jeun-Long |
| 4,957,302 A | 9/1990 | Maxwell |
| 4,969,232 A | 11/1990 | Michel |
| 5,004,259 A | 4/1991 | Ayers et al. |
| 5,028,065 A | 7/1991 | Danecker |
| 5,044,647 A | 9/1991 | Patterson |
| 5,060,960 A * | 10/1991 | Branscumb et al. ...... 280/250.1 |
| D321,335 S | 11/1991 | Aoki et al. |
| 5,064,209 A | 11/1991 | Kurschat |
| 5,074,620 A | 12/1991 | Jay et al. |
| 5,076,602 A | 12/1991 | Robertson et al. |
| 5,112,076 A | 5/1992 | Wilson |
| 5,131,672 A | 7/1992 | Robertson et al. |
| 5,143,391 A | 9/1992 | Robertson et al. |
| 5,152,543 A | 10/1992 | Sims et al. |
| 5,174,418 A | 12/1992 | Le et al. |
| 5,176,393 A | 1/1993 | Robertson et al. |
| 5,228,747 A | 7/1993 | Greene |
| 5,244,252 A | 9/1993 | Serber |
| 5,253,888 A | 10/1993 | Friedrich |
| 5,259,635 A | 11/1993 | Picker |
| 5,301,964 A | 4/1994 | Papac |
| 5,320,373 A | 6/1994 | Robertson et al. |
| 5,333,887 A | 8/1994 | Luther |
| 5,346,039 A | 9/1994 | Pfisterer |
| 5,355,977 A | 10/1994 | Kuschall |
| 5,382,036 A | 1/1995 | Counts et al. |
| 5,421,598 A | 6/1995 | Robertson et al. |
| 5,435,404 A | 7/1995 | Garin, III |
| 5,472,066 A | 12/1995 | Schillo et al. |
| 5,568,933 A * | 10/1996 | Mizuno ....................... 280/42 |
| 5,667,235 A | 9/1997 | Pearce et al. |
| 5,669,620 A * | 9/1997 | Robbins ................... 280/250.1 |
| 5,799,347 A * | 9/1998 | McCarthy ................... 5/81.1 R |
| 5,823,621 A | 10/1998 | Broadhead |
| 5,853,059 A | 12/1998 | Goertzen et al. |
| 5,884,928 A | 3/1999 | Papac |
| 6,129,415 A | 10/2000 | Galloway |
| 6,139,037 A * | 10/2000 | Papac ....................... 280/250.1 |
| 6,244,662 B1 | 6/2001 | Porcheron |
| 6,250,717 B1 | 6/2001 | Porcheron |
| 6,322,145 B1 | 11/2001 | Melgarejo et al. |
| 6,375,209 B1 | 4/2002 | Schlangen |
| 6,378,947 B1 | 4/2002 | Barber et al. |
| 6,488,332 B1 | 12/2002 | Markwald |
| 6,886,843 B1 * | 5/2005 | Papac ....................... 280/250.1 |
| 7,007,965 B2 | 3/2006 | Bernatsky et al. |
| 2003/0006578 A1 * | 1/2003 | Melgarejo et al. ......... 280/250.1 |

FOREIGN PATENT DOCUMENTS

| | | |
|---|---|---|
| DE | 29704034 U1 | 6/1997 |
| FR | 85288184 | 11/1984 |
| FR | 2562790 | 10/1985 |
| GB | 2141980 | 1/1985 |
| WO | 82/01313 | 4/1982 |

* cited by examiner

WHEELCHAIR

The present application is a continuation of application Ser. No. 10/281,431, filed Oct. 25, 2002, now U.S. Pat. No. 6,886,843, a continuation of application Ser. No. 10/026,360, filed on Dec. 18, 2001, now U.S. Pat. No. 6,607,250, which is division of application Ser. No. 09/702,928, filed on Oct. 21, 2000, now U.S. Pat. No. 6,331,036, which is a division of application Ser. No. 09/247,651, filed on Mar. 23, 1999, now U.S. Pat. No. 6,139,037, which is a division of application Ser. No. 08/684,412, filed on Jul. 23, 1996, now U.S. Pat. No. 5,884,928.

TECHNICAL FIELD

The present invention relates to wheelchairs. More particularly, the present invention relates to wheelchairs and chassis that are more easily assembled, disassembled, adjusted, and used for mobility of disabled persons.

BACKGROUND OF THE INVENTION

Conventional wheelchairs provide equipment for use by disabled persons in order to be mobile and to increase the opportunities of disabled persons to participate more fully in daily activities. Conventional wheelchairs are typically manufactured of metal tubes which are cut to length, bent into shape, and welded together to form a tubular frame that supports a seat and back. Wheels connected to the frame provide mobility. Push handles attach to the back of the frame for pushing the wheelchair or controlling its direction of the movement. The purpose of wheelchairs is to provide equipment which solves disability-related problems, so that disabled persons can more easily participate in everyday life activities while minimizing the problems created by the equipment.

Generally, wheelchairs for profoundly immobilized persons are custom-built using specific measurements of the particular person to use the wheelchair. The measurements are used to determine the particular width, depth, and height of the frame, the seat, and the seat back for the wheelchair. Generally, wheelchairs are manufactured in widths ranging from 10 inches to 20 inches, and depths ranging from 12 inches to 18 inches, with varying seat and back heights. Because of the many combinations of sizes, it is expensive to maintain inventories of specific sized component parts. Accordingly, manufacturers of wheelchairs cut elongated tubular members to size based on a customized specification for the particular individual. The tubes are assembled into a frame of a specific design. Production of an individual wheelchair is complex and slowed because custom parts have to be manufactured. Also, due to personalized customization of the dimensions of a wheelchair, it is not practical to maintain inventories of completed frames. Similarly, the large number of variations and combinations prevent retailers of wheelchairs from holding wheelchairs in inventory. Further, there often is a lag time of many weeks between ordering a custom wheelchair and delivery of the wheelchair to the user.

During manufacture, the frame members are typically joined together by welding. The seats, backs, pads, push handles and wheels are then conventionally connected to the frame using clamps, tubular connectors, latches, and bolts with nuts. While these secure the components to the frame, the connectors must be loosened, removed, and re-positioned for adjusting the orientation and position of the components. For aides to wheelchair users who are not skilled in mechanics, operation of these connectors may be difficult, awkward, and frustrating. Also, the connectors must be loosened or removed in order to disassemble the wheelchair for transport in cars.

Further, the tubular frame and the various connectors make conventional wheelchairs difficult to "grow" to accommodate the physical growth of the user. For example, side frames often limit the size of the seat that can be secured to the wheelchair. This presents problems for a child. Changing the size of the seat may require removal and replacement of frame tubes at a manufacturing facility or authorized dealer, which involves re-specification and manufacture of parts, and labor and time to re-work the wheelchair. If a larger seat, and therefore a wider frame, is initially used in a pediatric wheelchair, it may be necessary to position abductors and other support pads laterally inwardly of the sides of the frame. However, a child would have difficulty reaching outwardly to the drive wheels.

Disabled persons who look to wheelchairs for mobility also are dependent on the wheelchair for bodily support. It is important that the wheelchair be lightweight and easily maneuverable, in order to conserve the energy of the person. Also, the seat and back should be easily adjustable to provide proper posture and comfort. Improper seating is not only uncomfortable but may create additional physical problems for the person using the chair. The width, height, depth, and tilt of the seat as well as the width, height, and tilt angle of the back of the seat, affect proper seating. Proper adjustments of the seating variables, together with proper sizing of the wheelchair contributes to a more neutral skeletal alignment and may impede the progression of skeletal deformities and muscle contracture, better manage seating pressures and reducing the potential for pressure sores, improve the seating stability of the occupant, increase sitting tolerance through increased comfort, and decrease fatigue. The tubular frame however often interferes with attachment and adjustment of the pads and abductors which may be critical to properly supporting the user in the wheelchair.

Accordingly, there is a need in the art for improved wheelchairs that are readily assembled, disassembled, adjusted, and used for and by disabled persons. It is to such that the present invention is directed.

SUMMARY OF THE INVENTION

The present invention provides an improved wheelchair having a lower chassis, a chassis back, and an upper chassis defined by flat plate surfaces. The lower and the upper chassis each have a pair of elongated substantially parallel arms that extend from respective land portions of the chassis away from the chassis back. The arms connect to caster wheels at distal portions thereof. A seat attaches to the chassis for supporting a person in the wheelchair. A pair of push handles attach to the chassis back. A pair of drive wheels attach to the chassis for moving the wheelchair. Axle mounts for the drive wheels readily attach to the chassis back which facilitates adjustments to the track, camber, height, and size of the wheels. The seat support readily attaches to the flat surfaces and permits easier adjustments to the seat angle, the seat position relative the axles of the wheels, and the seat back angle. Assembly and disassembly of the component parts is facilitated, not only for transporting the wheelchair, but for installing larger components to accommodate growth of the user.

The present invention further provides improved components for wheelchairs. A seat support according to the present invention provides adjustable orientation as to seat angle, height, and position relative the axles of the drive wheels. The seat support comprises a pair of tubular frame columns for rigidly connecting in a spaced-apart relationship to a chassis of a wheelchair. Opposing sides of each of the frame columns define a plurality of pairs of aligned openings spaced apart in the frame columns between an upper portion of the frame columns and a lower portion. A pair of support pins extend between the pair of frame columns through one of the aligned pairs of openings, for setting the height of a seat in the wheelchair. A pair of seat columns are slidably received within the frame columns with the lower ends supported on the support pins and the upper ends defining a pair of spaced-apart openings. A pair of seat connectors are received within the seat columns. The seat connectors each have an upper surface that receives a seat means for the use of the wheelchair. A depending pivot mount defines a pivot bore at one side and an arcuate member defines a plurality of angle bores at an opposite side. Bolts extend through the openings in the upper ends of the seat columns and through the pivot bore and a selected one of the angle bores, for disposing the seat connector at angle relative to the seat support columns. Seat means rigidly connects to the seat connector for being disposed at a selected angle. In a preferred embodiment, a seat frame attaches to the seat connector and includes elongated slots for selective positioning of the seat in the wheelchair.

The invention provides an axle mount for attaching a quick-release wheel to a wheelchair. The axle mount comprises a split-sided cylinder having a pair of spaced-apart flanges that extend laterally from the edges of the split in the cylinder. The flanges define bores for receiving fasteners to clinch the split-sided cylinder together, whereby an axle sleeve received in the cylinder is rigidly secured therein. A mounting flange extends outwardly of the split-sided cylinder and defines at least one bore therethrough for receiving a fastener for securing the axle mount to a wheelchair chassis. In a preferred embodiment, the mounting flange defines a longitudinal slot disposed at an acute angle to the cylinder for receiving a nut and defines a plurality of spaced-apart bores along the slot. The axle mount, being attached to a wheelchair chassis and pivoted on one of the bores in the spaced-apart flanges, is selectively disposed at an angle on the chassis for setting the camber of a wheel attached to the axle sleeve.

The invention provides a caster block that attaches to a frame of a wheelchair for receiving a caster wheel. The caster block comprises a housing having a central bore and a plurality of spaced-apart channels for receiving bolts for attaching the housing to a frame of a wheelchair. A resilient core is received in the central bore and defines an axial bore for receiving a shaft of a caster wheel. The distal ends of the core define recesses which receive bearing races. The caster wheel is rotatably engaged to the caster block by extending the shaft of the caster wheel through the bore of the core and securing the shaft with a nut. In a preferred embodiment, the housing defines at least one channel therethrough which receives a pin having an annular flange extending outwardly in a lower portion. A spring is received on the pin and seated against the flange. A cam lever pivotally connects to an end of the pin. The cam lever, being moved from a first position to a second position, moves the pin within the channel from a recessed position within the housing to an extended position with a portion of the pin extending outwardly of the housing, for engaging a slot in a flange of a caster wheel to lock the wheel in a fixed position.

The present invention provides a wheel lock that attaches to a frame member of a wheelchair for restraining a wheel on the wheelchair from rotation. The wheel lock comprises a bottom plate that has an flange that defines an arcuate cavity on a side edge and a mounting block on an opposing side. The flange and the mounting block extend outwardly in a first direction from the plate to define a recess. The block defines a first tapped bore in an upper surface and a pair of bores in a side surface. A top plate has an edge that matingly engages the arcuate cavity of the top plate and defines a bore that aligns with the tapped bore for receiving a fastener for securing the top plate to the bottom plate and sandwiching the frame member in the recess between the top and the bottom plates. A handle pivotally attaches to one of the bores in the side surface. A lock arm pivotally attaches to the other of the bores in the side surface and is pivotally engaged to an end of the handle. A rigid pin extending laterally from an end of the lock arm. The handle moves between a first position and a second position in order to move the rigid pin from an engaged position against a wheel of a wheelchair to a disengaged position spaced apart from the wheel.

Objects, features, and advantages of the present invention will become apparent from a reading of the following specification, in conjunction with the drawings and the appended claims.

DETAILED DESCRIPTION OF THE PREFERRED EMBODIMENTS

Figure 1:
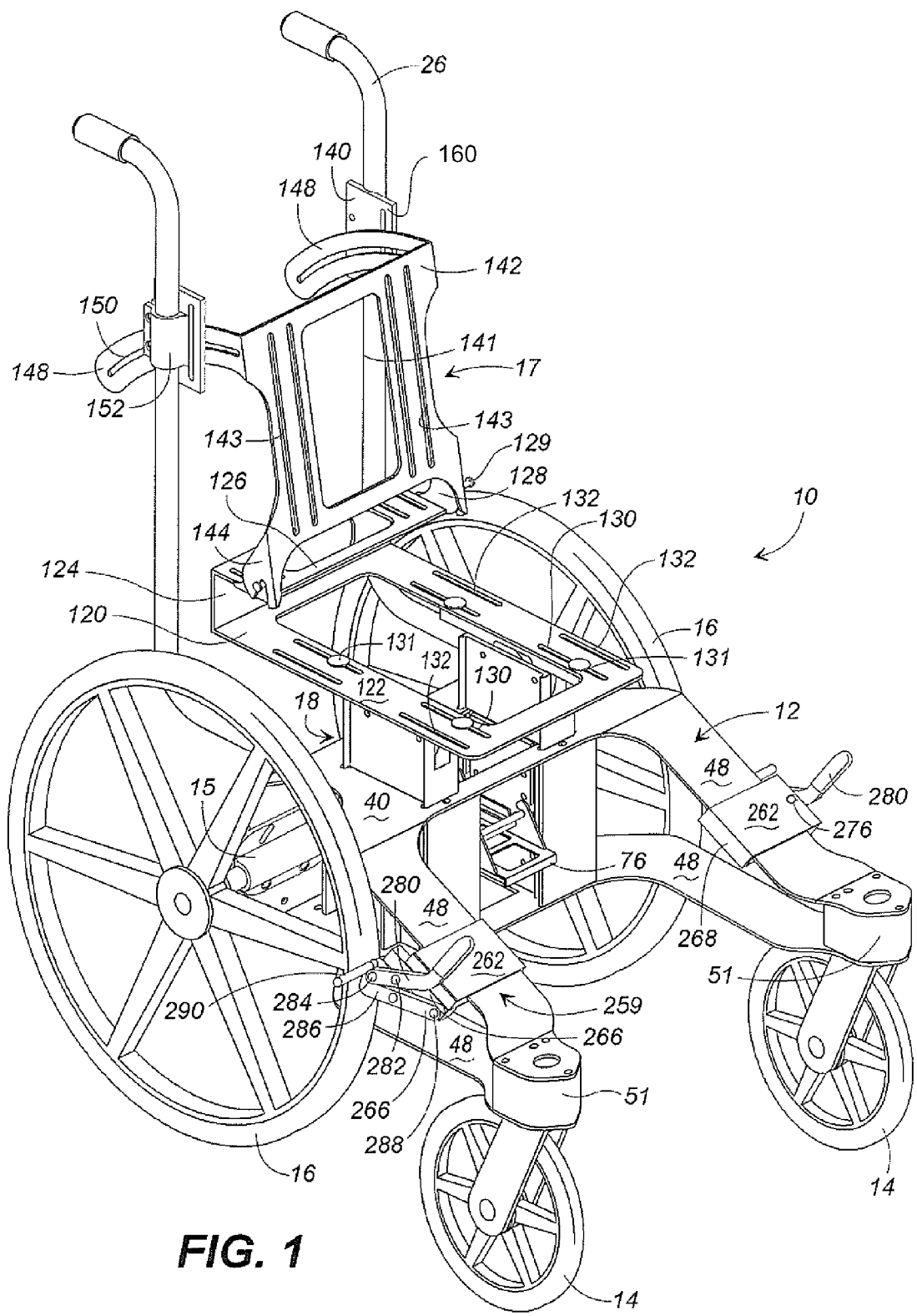
FIG. 1 is a perspective exploded view of a preferred embodiment of a wheelchair according to the present invention.

Referring now in more detail to the drawings, in which like numerals indicate like parts throughout the several views, FIG. 1 shows a perspective view of a preferred embodiment of a wheelchair 10 according to the present invention in which subassemblies (a) for rolling movement of the wheelchair, (b) for seating and orientation adjustments, and (c) for pushing and directing the wheelchair, readily attach to a chassis 12 having attaching surfaces defined by flat plates. The rolling movement subassembly includes drive wheels 16 that are mounted in axle mounts 15 which are track, camber and height adjustable. The seat subassembly generally designated 18 includes a seat frame 120 and an adjustable seat back generally designated 17. Push handles 26 connect to the chassis 12 and to the seat back for pushing and directing the wheelchair. These subassemblies are discussed in detail below.

The Chassis 12

Figure 2:
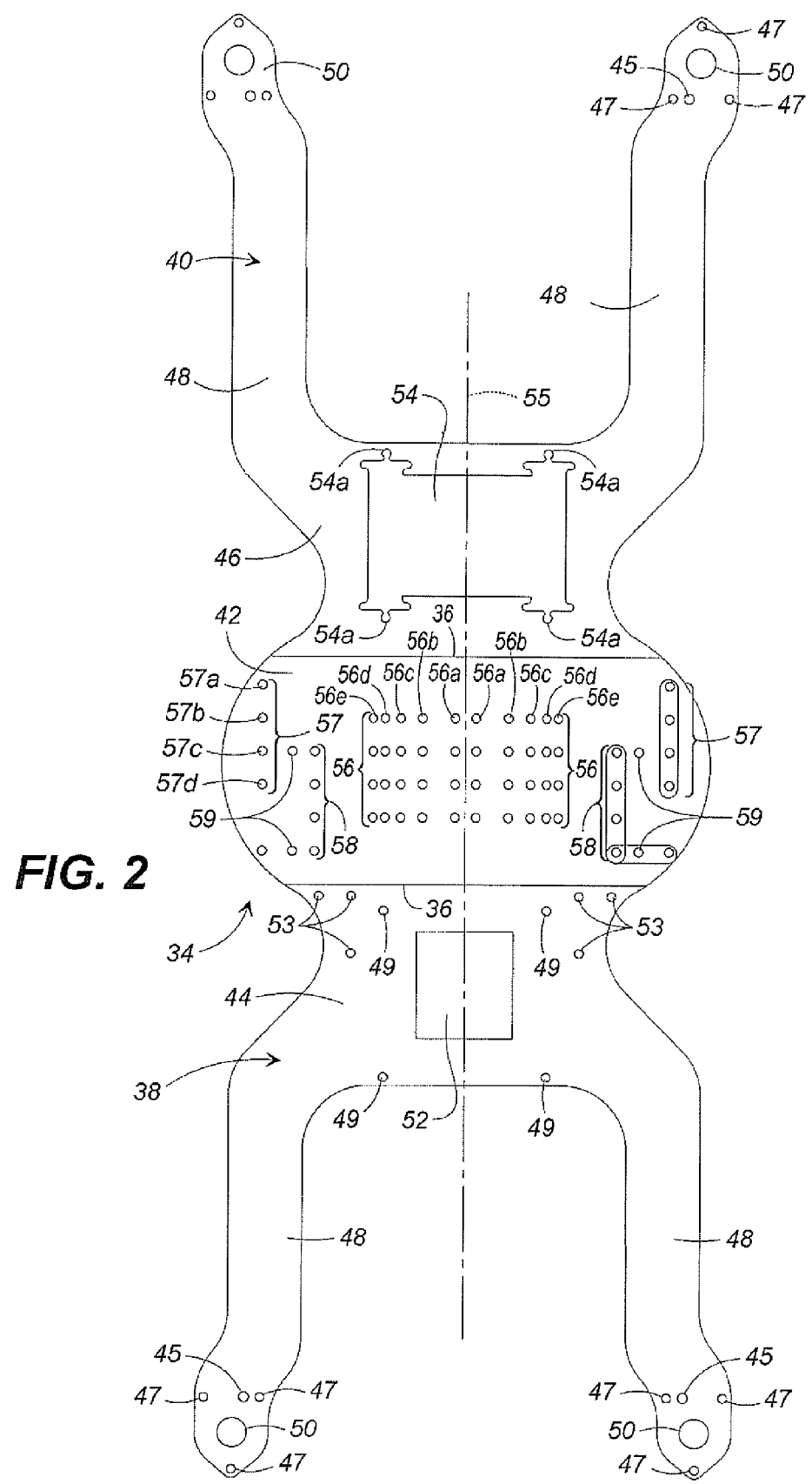
FIG. 2 is a plan view of a metal sheet for forming the chassis of the wheelchair illustrated in FIG. 1.

FIG. 2 illustrates in plan view a flat plate 34 that folds along fold lines 36 to define the chassis 12. The plate 34 defines a lower chassis 38, an upper chassis 40, and a chassis back 42, separated by the respective fold lines 36. The lower chassis 38 includes a land portion 44 and the upper chassis 40 includes a land portion 46. The lower chassis 38 and the upper chassis 40 each include a pair of elongated substantially parallel arms 48 that extend from the respective land portions 44 and 46. The arms 48 define openings 45, 47, and 50 in distal ends thereof for connecting caster blocks 51 (see FIG. 1) and caster wheels 14 to the chassis 12, as discussed below.

The land portion 44 in the lower chassis 38 defines two pairs of openings 49, an opening 52, and a plurality of openings 53 on laterally opposing sides, for purposes discussed below. The opening 52 reduces the weight of the chassis 12 and provides an access port into the interior of the chassis for assembly and disassembly of the wheelchair 10. The openings 53 receive bolts for connecting axle mounts for stroller wheels. The land portion 46 in the upper chassis 38 defines an opening 54 with notches 54a, for receiving the seat support 18 as discussed below. The plate 34 is preferably a sheet of 0.125 inch stainless steel. In an alternate embodiment, the chassis 12 is molded or cast to shape using a high strength polymer, plastic material, or metal.

The chassis back 42 defines three sets of aligned pairs of openings 56, 57, and 58 for receiving bolts that attach the axle mount 15 to the chassis back 42. Each set of opening 56, 57, and 58 are symmetrically disposed relative to a longitudinal axis of the chassis 12 indicated by phantom line 55. In the illustrated embodiment, a central portion of the chassis back 42 includes four sets of the symmetrically aligned pairs of openings 56 which are spaced apart between the lower chassis 38 and the upper chassis 40. As discussed below, the openings 56 cooperate with the axle mount 15 to define the camber of the drive wheels 16. Five openings 56a, 56b, 56c, 56d, and 56e are provided in each set on the two sides of the chassis 12. The five openings 56a, 56b, 56c, 56d, and 56e correspond to 12°, 9°, 6°, 3°, and 0° of camber, respectively. Four vertically-spaced sets of the openings 56 are provided to accommodate different sizes of wheels 16 without affecting the height of the wheelchair seat relative the rolling surface on which the wheelchair moves.

The laterally outer portions of the chassis back 42 each define the second set of spaced-apart openings 57. Four openings 57 are provided in spaced-apart relation in correspondence with the spacing for the four sets of openings 56. The openings 57 are used in association with a bolt and nut for securing the axle mount 15 to the chassis back 42, as discussed below. The particular opening 57a, 57b, 57c, and 57d used corresponds to the selected wheel size opening 56. Also, the openings 57 may be used for attaching the lower push handle mounts to the chassis back 42, as discussed below.

The third set of openings 58 are defined in the chassis back between the central portion and the lateral outer portions. The openings 58 provide a pivot point for the axle mount 15, as discussed below. The openings 56, 57, and 58 accordingly facilitate connecting the axle supports 15 for the wheels 16, so that the track, the camber, and the height of the drive wheels 16 can be adjusted, as discussed below.

In the illustrated embodiment, a fourth set of symmetrically aligned pairs of openings 59 are used for connecting the supports for the lower ends of the push handles 26, as discussed below.

The Seat Support 18

Figure 3:
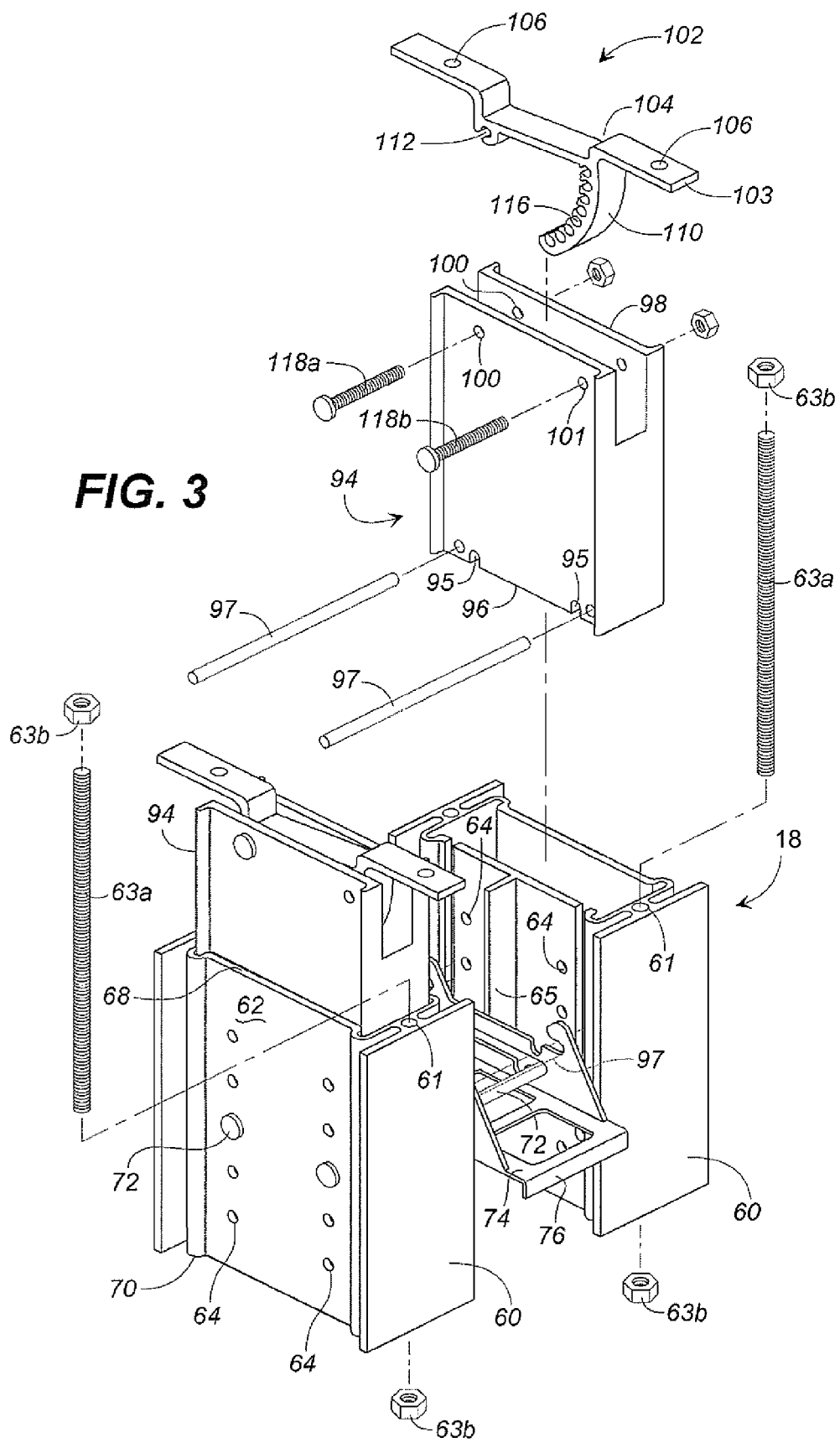
FIG. 3 is a detailed perspective exploded view of a seat support that permits positional adjustment of the seat that mounts to the chassis illustrated in FIG. 2.

FIG. 3 is a detailed perspective and partially exploded view of the seat support 18 which connects to the land portions 44 and 46 in the lower and upper chassis 38 and 40. The seat support of the present invention permits independent adjusting of the seat angle, the seat height, and the seat position relative a longitudinal axis of the wheelchair 10. The seat support 18 comprises a pair of tubular frame columns 60 that rigidly connect to the chassis 12 in a spaced-apart relationship to the lower chassis 38 and the upper chassis 40. The shape of the opening 54 corresponds to the cross-sectional shape of the frame columns 60. The frame columns 60 define openings 61 for receiving bolts 63a for securing the columns to the chassis 12 with nuts 63b. The bolts 63a pass through the openings 49 in the lower chassis 38 and the notches 54a in the upper chassis 40 for connecting the frame columns 60 to the chassis 12. A flange 65 extends laterally from an inner one of the sides 62 for support. The opposing sides 62 of the frame columns 60 define a plurality of pairs of aligned openings 64 which are vertically spaced-apart between an upper portion 68 of the framed columns 60 and a lower portion 70. A pair of support pins 72 slidably extend between the pair of frame columns 60 through a selected one of the aligned pairs of openings 64.

Figure 4:
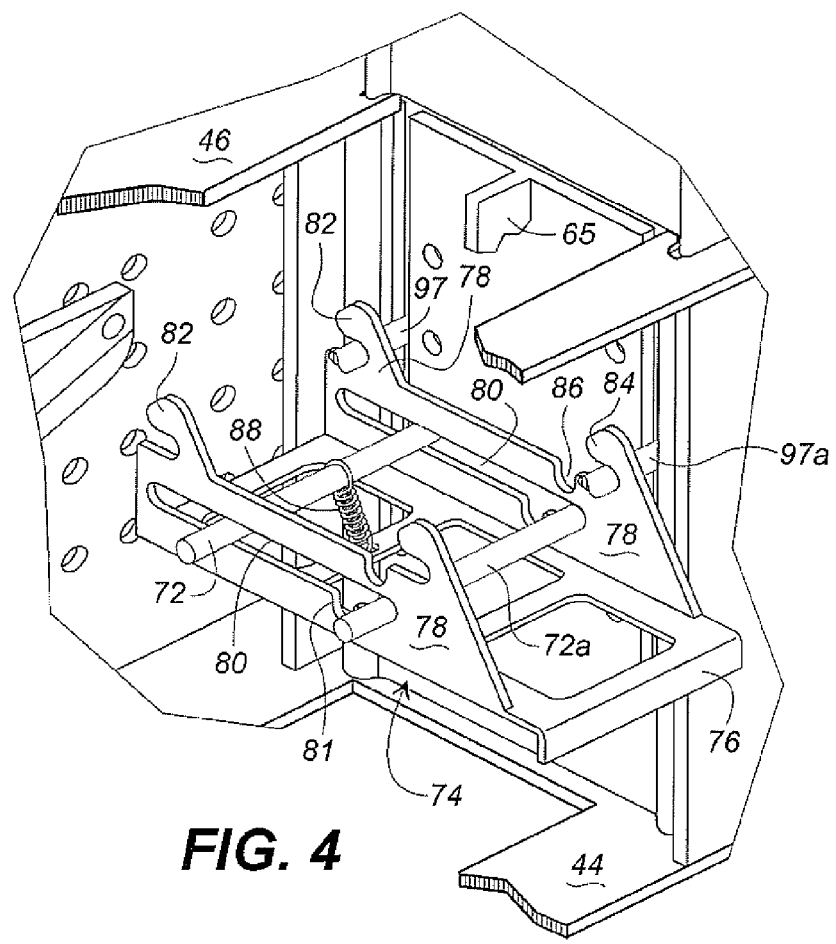
FIG. 4 is a detailed perspective view of the latch and handle for the seat support illustrated in FIG. 3.

The support pins 72 engage and support a latch handle 74 which is disposed between the frame columns 60. As best illustrated in FIG. 4, the latch handle 74 has a front grip 76 and a pair of upwardly extending sides 78. A pair of hook-like ears 82 and 84 extend upwardly at respective distal end portions of the sides 78. An upper edge of the side 78 defines a recess 86 adjacent the ear 84, for purposes discussed below. Each side 78 defines a longitudinal slot 80 through which the pins 72 pass. A recess 81 is defined in a lower edge of the slot 80 near the ear 84. The handle 74 can move longitudinally relative the chassis 12 away from and towards the chassis back 42. A spring 88 connects between one of the pins 72 and the handle 74 for biasing the handle to a locked position towards the chassis back 42. The flanges 65 facilitate aligning the handle 74 between the frame columns 60.

Returning to FIG. 3, a pair of seat columns 94 are slidably received within the frame columns 60. The lower ends 96 of the seat support columns 94 are supported on the pins 72 which are received in notches 95. In an alternate embodiment, a plate is slidingly received within the frame column 60 for being supported directly on the support pins 72. The plate is preferably made of steel, while the seat column 94 and the frame column 60 are preferably aluminum extrusions. The seat column 94 and the frame column 60 can be molded using a high strength polymer or composite material, a plastic, or metal.

The height of a cushioned seat (not illustrated) connected to the seat support 18 accordingly can be adjusted by positioning the support pins 72 in a selected one of the pairs of aligned openings 64 in order to set selectively the height of the seat columns 94 relative to the chassis 12. A pair of elongate members 97 rigidly connect between the lower ends of the seat columns 94. An upper end 98 of each seat support column 94 defines a pair of spaced apart openings 100 and 101, for a purpose discussed below.

Seat connectors 102 insert into the seat columns 94. The seat connectors 102 have an elongate member 103 with an upper surface 104 and a pair of spaced-apart bores 106 defined in the distal portions. An integral angle mount 110 and pivot mount 112 depend from the member 103. The pivot mount defines a pivot bore at one side and the angle mount 110 defines a plurality of angle bores 116 disposed in the arcuate member at an opposite side. Bolts 118 extend through the openings 100, 101 and through the pivot bore 112 and a selected one of the angle bores 116, for disposing the seat connectors 102 at an angle relative to the seat support columns 94.

With reference to FIGS. 1 and 3, a seat frame 120 attaches to the seat connectors 102 for holding a conventional cushioned seat for the wheelchair 10. The seat frame 120 in cross-sectional view is substantially J-shaped as defined by a bottom 122, a side 124, and an upper member 126 that extends over a portion of the bottom. A pair of ears 128 extend upwardly from opposing sides of the upper member 126. A lug 129 extends outwardly of each ear 128, for a purpose discussed below. In the illustrated embodiment, the lugs 129 are defined by bolts extending through bores in the ears 128, with nylon cylinders received on the bolts outwardly of the ears. In an alternate embodiment (not illustrated), hook latches pivotally connect to the ears 128 for securing the seat back 17 to the seat frame 120. The seat frame 120 is preferably formed from a sheet of 0.125 inch stainless steel, and folded to define the side 124 between the bottom 122 and the upper member 126 with its ears 128.

The bottom 122 defines aligned pairs of elongated slots 130 on opposing sides for engaging the seat frame 120 to the seat connectors 102. Bolts 131 extend through the slots 130 and the bores 106 and engage nuts for securing the seat frame 120 to the seat connectors 102. The bottom 122 also defines aligned pairs of elongated slots 132 on opposing sides, spaced outwardly of the slots 130, for engaging a conventional cushioned seat (not illustrated) to the seat frame. Conventional seats comprise a wood base, foam padding, and upholstery. The cushioned seat rigidly connects to the seat frame 120 with a plurality of threaded fasteners that extend upwardly through the slots 132 and engage T-nuts attached on a lower surface of the wood base of the seat, to lock the seat to the seat frame. Foot rests and arm rests (not illustrated) conventionally attach to the wood base of the cushioned seat using T-nuts and fasteners.

The Seat Back 17

Figure 5:
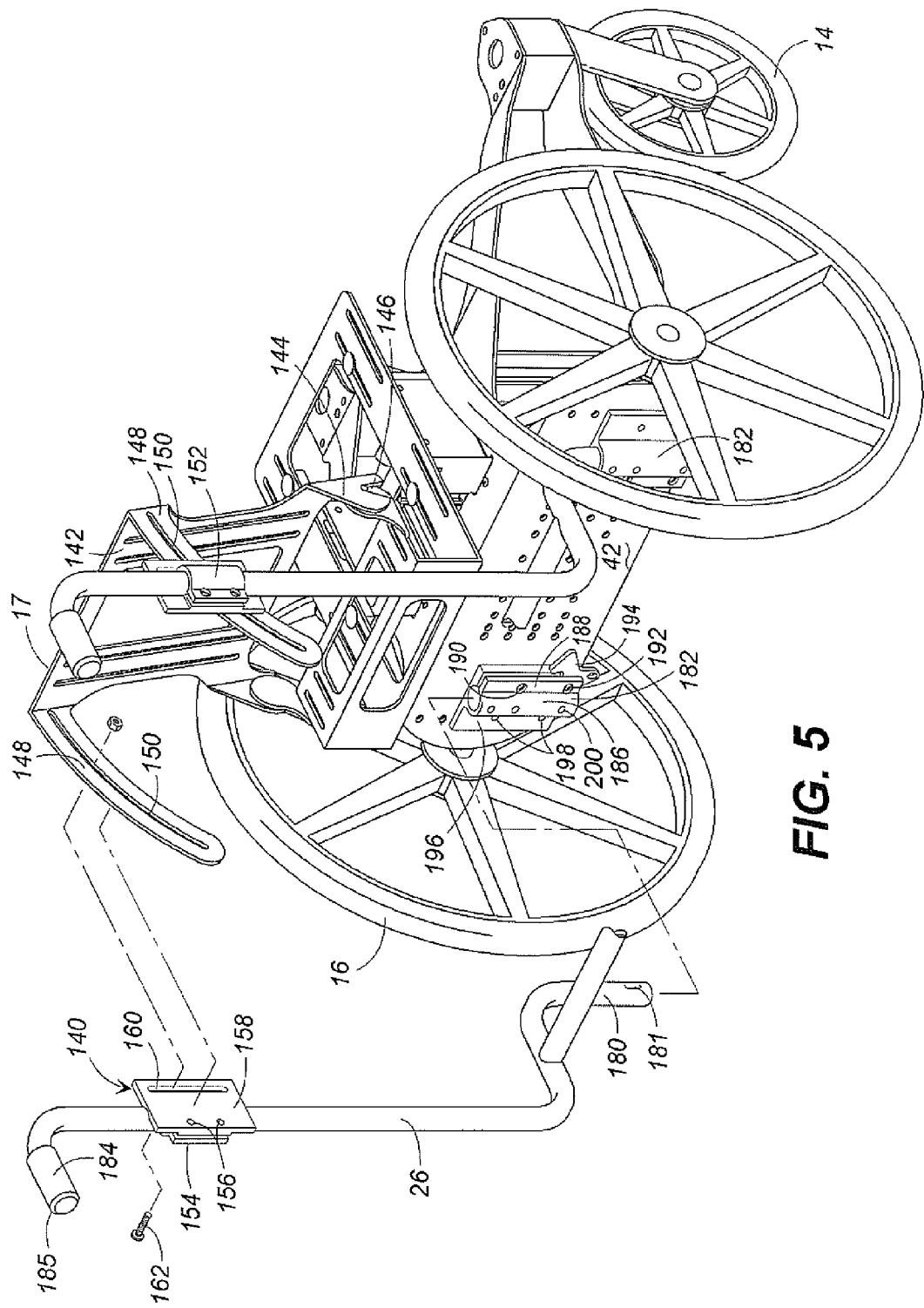
FIG. 5 is a perspective back view of the wheelchair illustrated in FIG. 1.

With reference to FIGS. 1 and 5, the seat back 17 pivotally connects to the seat frame 120 and to brackets 140 on the push handles 26. The seat back 17 includes a back frame 142 from which pivot tabs 144 extend rearwardly on opposing sides. The pivot tabs 144 each define a generally U-shaped slot 146 for engaging the lugs 129 on the ears 128 and thereby pivotally engaging the seat back 17 to the seat frame 120. A pair of arcuate pivot arms 148 extend rearwardly at an upper end of the seat back 17. Each arm 148 defines an arcuate slot 150 through which a threaded fastener extends for engaging the arm to the bracket 140 on the respective push handle 26. In an alternate embodiment (not illustrated), the slot 150 defines a series of steps to restrict inadvertent movement of the seat back should the securing fasteners loosen. Connecting the arms 148 to the brackets 140 secures the seat back 17 in a selected position at an angle relative the seat frame 120. In the illustrated embodiment, the back frame 142 defines an opening 141 which reduces the weight of the wheelchair. A conventional cushioned seat back (not illustrated) attaches to the back frame 142 by threaded fasteners that slidingly extend through longitudinal slots 143 and engage T-nuts fixed to the cushioned seat back. In the illustrated embodiment, the seat back 17 is made from a steel plate and folded to define the pivot tabs 144 and the pivot arms 148.

As best illustrated in FIG. 5, the brackets 140 are extruded members defining a split-side cylinder 152 for slidingly receiving a push handle 26. Flanges 154 extend laterally of the edge of the split in the cylinder 152. A pair of threaded bores 156 in the bracket 140 receive bolts for tightening the split cylinder 152 against the push handle 26 and thereby securing the bracket in place on the push handle. The bracket 140 includes a flange 158 having an elongated slot 160. A bolt passes through the slot 160 and the slot 150 in the arm 148 to secure the seat back 17 to the bracket 140 in the selected angled position relative the seat frame 120.

The Push Handles 26

FIG. 5 is a back perspective view of the wheelchair 10 and particularly illustrates the connection of the push handles 26 to the wheelchair to the chassis 12. The push handles 26 are elongated tubes having a hand grip 184 defined at an upper end 185 and a lower end 180 that is slidingly received in a bracket 182 attached to the chassis back 42. The bracket 182 is structurally similar to the bracket 140, which are preferably formed as extrusions. The bracket 182 has a split-side cylinder 186 for receiving the lower ends 180 of the push handles 26. Flanges 188 extend laterally of the split-side cylinder 186. The flanges 188 define a pair of threaded bores 190 and 192. Bolts are connected to the bores 190 and 192. A hook latch 194 pivotally mounts between the edges of the split-side cylinder 186 to the bolt in the bore 190. The latch 194 is biased inwardly by a spring. The latch 194 engages a slit 181 in the lower end of the push handle 26 and thereby engages the push handle in the bracket 182. A flange 196 extending laterally of the cylinder 186 includes two bores 198 for receiving bolts that extend through holes in the chassis back 42 for securing the bracket 182 to the chassis 12. Although not illustrated, conventional anti-tip tubes insert into a lower opening of the cylinder 186 and are secured in place by a bolt extending through a bore 200.

The Drive Wheels 16

Figure 6:
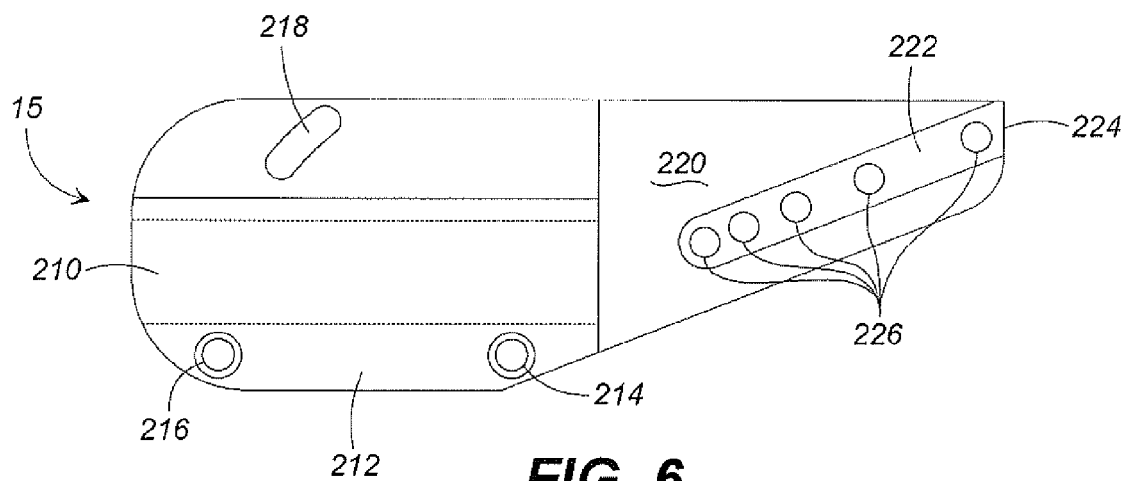
FIG. 6 is a plan view of an axle mount for the wheels of the wheelchair illustrated in FIG. 1.

FIG. 6 is a plan view of the axle mount 15 for connecting the drive wheels 16 to the chassis 12. The axle mount 15, also preferably an extrusion, comprises a split-side cylinder 210 having spaced apart flanges 212 extending laterally from the split. A bore 214 extends through the flanges 212 to define a pivot point for the axle mount 15, as discussed below. A tapped bore 216 is formed in an outer portion of the axle mount 15. An arcuate slot 218 is defined in a flange surface opposite the flange 212 and receives a bolt therethrough for pinchingly securing the axle mount 15 to the chassis back 42. A flange surface 220 extends laterally from the split-side cylinder 210. An elongated slot 222 is defined in the surface of the flange 220. The slot extends from a distal edge 224 at an angle towards the cylinder 210. The slot 222 is sized for slidingly receiving a nut to engage a bolt as discussed below. A plurality of openings 226 are spaced apart in the slot 222. The spacing between the adjacent openings 226 corresponds to the spacing of the openings 56 in the chassis back 42. These openings 226 and 56 cooperate to define the camber of the wheels 16. A bolt extends through a selected one of the openings 56 and its corresponding opening 226 in the axle mount 15 and engages the nut in the slot 222, in order to set the camber of the drive wheels. In an alternate embodiment, the openings 226 are tapped for engaging the bolt, thereby avoiding the need to machine the slot 222 and to use the nut.

The split-side cylinder 210 receives a conventional tubular axle sleeve that receives a quick-release pin for holding quick-release wheels, which are conventional in the art. The threaded bore 216 receives a bolt, and cooperates with the opening 214 and the bolt therethrough to tightly bring the split-sides of the cylinder 210 together in order to clinch and secure the quick-release axle sleeve within the cylinder.

The Caster Blocks 51

Figure 8:
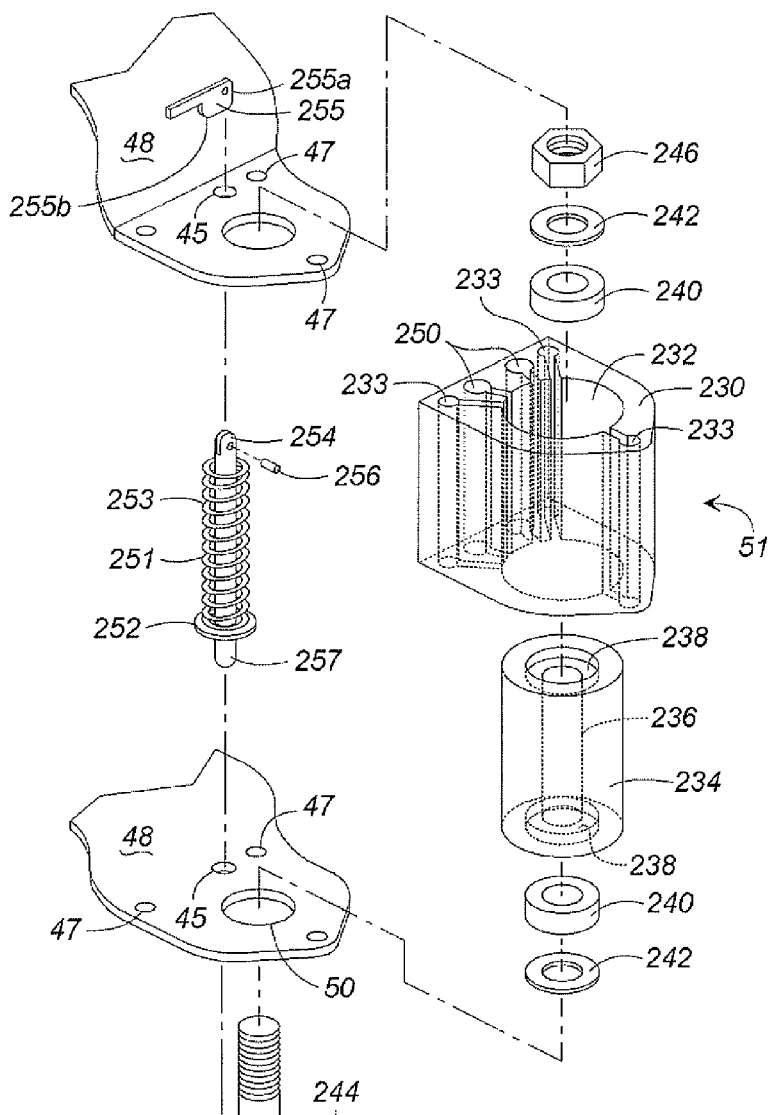
FIG. 8 is a exploded perspective view of the caster block for the wheelchair illustrated in FIG. 1.
Figure 8:
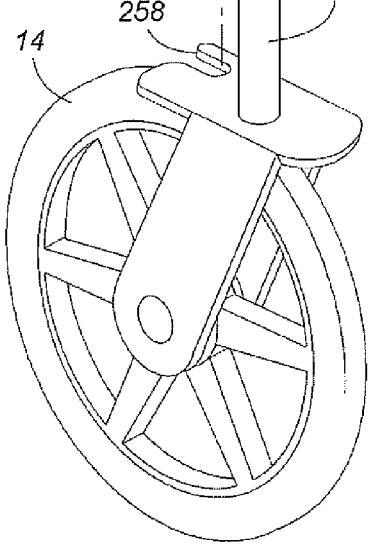

With reference to FIGS. 1 and 8, the caster blocks 51 receive the caster wheels 14 for rolling movement of the wheelchair 10. The caster blocks 51 have an extruded housing 230 which defines a cylindrical central bore 232 therethrough with a plurality of channels 233 for receiving bolts (not illustrated) that pass through the openings 47 for securing the caster blocks to the distal ends of the arms 48. A resilient core 234 is received in the bore 232. The core 234 is preferably molded with polyurethane. The core 234 defines a cylindrical bore 236 therethrough and the distal ends include countersunk recesses 238 for receiving bearing races 240. A plate washer 242 covers the bearing race 240. A shaft 244 of the caster wheel 14 extends through the bore 236 and engages a nut 246 for securing the caster wheel in the caster block 51.

The illustrated embodiment of the present invention provides a caster wheel lock that selectively restricts rotation of the castor wheel 14. The housing 230 defines a pair of channels 250 for receiving a pin 251. A flange 252 extends outwardly near a lower end of the pin 251 to define a seat for a spring 253. A lug 254 projects upwardly from the pin 251 and through the opening 45 in the arm 48. A lower surface of the arm 48 on the upper chassis 40 acts as a stop for the upper end of the spring 253. A cam lever 255 pivotally connects with a pin 256 to the lug 254. A tip 257 of the pin 251 extends through the opening 45 in the arm 48 on the lower chassis 38 for selective engagement with a slot 258 in a circular flange of the caster wheel 14. The illustrated embodiment of the caster block 51 provides a pair of the channels 250 so that a single extrusion can be used for both the right and left arms 48. The openings 45 are off-center so as to provide a sufficient surface for the operation of the cam lever 255.

The Wheel Lock

Figure 9:
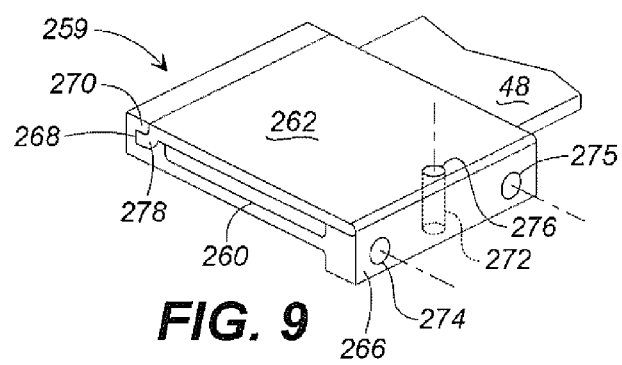
FIG. 9 is a perspective view of the wheel lock for the wheelchair illustrated in FIG. 1.

With reference to FIGS. 1 and 9, the wheelchair includes a pair of wheel locks 259 to hold the wheels 16 from easily rotating. The wheel lock 259 comprises a bottom plate 260 and a top plate 262 which sandwich an arm 48 in a recess between the plates, as best illustrated in FIG. 9. The bottom plate 262 has a mounting block 266 on one side and on the opposite side has a channel 268 that is defined by a flange 270. The mounting block 266 and the flange 270 extend outwardly from the bottom plate on one side to define a recess therebetween for receiving the arm 48. The mounting block 266 defines a tapped bore 272 that extends from the upper surface and a pair of tapped bores 274 and 275 on the side. The top plate 262 defines an opening 276 that aligns with the tapped bore 272 in the mounting block 266. The top plate 262 defines on the opposite side an arcuate edge 278 that matingly engages the channel 268. A bolt extends through the opening 276 and engages the bore 272 to secure the top plate 262 and the bottom plate 260 together around the arm 48.

A pivotable handle 280 attaches to the side of the mounting block 266 and pivots at a pin 282 that connects to the bore 274. A link pin 284 connects the handle 280 to an arm 286 that pivotally connects with a pin 288 to the bore 275 in the mounting block 266. A serrated dowel pin 290 extends outwardly at a distal end of the arm 286.

Operation of the Wheelchair

The wheelchair 10 of the present invention provides mobility for disabled persons, while being readily assembled, disassembled, or adjusted to accommodate the needs of the user. The wheelchair 10 is readily disassembled for transportation in a car. With reference to FIGS. 1 and 5, the guide handles 26 are removed by releasing the latches 194 from engagement in the slits 181 of the handles 26. In a preferred embodiment the lower ends of the latches 194 are connected together by a flexible cord (not illustrated). Pulling the cord downwardly causes the latches 194 to pivot towards each other and outwardly of the slits 181. The handles 26 are then grasped and pulled upwardly, thereby detaching the lower ends from the bracket 186 while the seat back 17 detaches from pivotal engagement with the lugs 129.

The seat and seat frame 120 may then be removed. With reference to FIGS. 1 and 4, the handle 74 is moved from its locked position to the release position by pulling the grip 76 outwardly towards the caster wheels 14 and upwardly away from the rolling surface. The members 97 are thereby removed from engagement with the ears 82 and 84, and the member 97a slips into the notch recesses 86 in the sides 78. The pin 72a slips into the recesses 81 in the slots 80, and this holds the handle 74 in the release position. The members 97 are thereafter clear of interference from the ears 82 and 84. The seat frame 120 is grasped and pulled upwardly. The seat columns 94 slidably exit the frame columns 60.

With the seat columns 94 (and seat) removed from the frame columns 60, the height of the seat columns in the wheelchair 10 can be adjusted. With reference to FIG. 3, the pins 72 are selectively inserted into one of the aligned pairs of openings 64 in order to position the seat columns 94 higher or lower in the wheelchair 10 (and thereby adjust the height of the seat connected to the seat frame 120 on the seat columns and thereby resulting in a change in the seat height relative to the rolling surface on which the wheelchair 10 travels). This is accomplished by first detaching the spring 88 from engagement with the handle 74. The pins 72 are removed from the frame columns 60 and re-inserted into one of the aligned pairs of openings 64 at the selected height. The pins 72 extend through the slots 80 of the handle 74 in order to support the handle between the frame columns 60. The spring 88 is re-attached for biasing the handle 74 into the locked position.

With reference to FIGS. 1 and 4, the seat frame 120 can be re-installed in the wheelchair 10. The seat columns 94 are aligned with the frame columns 60 and lowered telescopically into the frame columns. The member 97a bears on the notch 86 and pushes the handle 74 downwardly. The spring 88 causes the handle to retract to the locked position. The ears 82 and 84 engage and lock the members 97. The handle 74 moves relative to the pins 72 in the slot 80 to the locked position. It is noted that for front wheel drive, the seat frame 120 can be rotated 180° and then the seat columns 94 can be inserted into the frame columns 60.

The subassembly supporting the cushioned seat also provides independent adjustment of the angle of the seat, of the position of the seat relative to the seat back 17, and of the position of the seat frame 120 relative the drive wheel 16. With reference to FIG. 3, the seat angle is adjusted by removing the bolt 118b from engagement with the one of the angle bores 116 in the seat connector 102. The seat frame is pivoted about the bolt 118a that extends through the pivot bore 112. When the seat frame 120 is positioned at the selected angle, the bolt 118b is re-inserted through the opening 101 and the selected one of the angle bores 116. In the illustrated embodiment, the pivot bores 116 provide a range of seat angles between −5° and 47.5°, at 7.5° increments.

With reference to FIG. 1, the position of the cushioned seat (not illustrated) on the seat frame 120 is adjustable relative to the seat back 17. This accommodates the growth of the person using the wheelchair 10. The cushioned seat connects conventionally with fasteners passing through the slots 132 in the seat frame 120. In order to adjust the longitudinally position of the seat relative the seat back 17, the fasteners are loosened and the seat slidably moved with the fasteners moving along the slots 132. When the seat cushion is in its selected location, the fasteners are tightened to re-secure the seat to the seat frame 120.

The seat frame 120 is longitudinally positionable relative to the chassis back 42. The fasteners extending through the slots 130 and the bores 106 in the seat connector 102 are loosened. The bolts connecting the arcuate arms 148 to the brackets 140 are likewise loosened. The seat frame 120 is then slidably moved relative the seat connector 102. The fasteners travel in the slots 130. The seat back 17 pivots as the seat frame 120 is moved longitudinally. The seat back 17 thereby freely moves relative the brackets 140 as the connecting bolts slide along the arcuate slots 150. When the seat frame 120 is in its selected position, the fasteners and bolts are re-tightened to secure the seat frame 120 to the seat connector 102. The fasteners connecting the arms 148 of the seat back 17 to the brackets 140 are tightened to secure the seat back in an angled position relative the seat. By adjusting the position of the seat frame, the balance of the wheel chair is changed. This also changes the position of the shoulder of the user relative to the wheelchair, which is important in enabling the user to propel the wheelchair to the best of the user's ability.

The angle of the seat back 17 is independently adjustable. The bolts 162 connecting the arcuate arms 148 to the brackets 140 are loosened. The seat back pivots at its engagement of the U-shaped slot 146 with the lugs 129. When the seat back 17 is positioned to a selected angle, the bolts 162 are tightened to secure the seat back. A cushioned seat back (not illustrated) connects to the back frame 142 and is selectively positioned on the back frame by sliding the fasteners along the slots 143.

The track of the drive wheels 16 is also adjustable, for accommodating different sizes of seats and backs and for facilitating adjusting the wheelchair 10 for the particular user. With reference to FIGS. 1, 2 and 6, the track between the wheels 16 is adjusted by loosening the bolts in the bores 214 and 216. The split cylinder 210 opens slightly allowing the quick-release axle sleeve to slide longitudinally relative the cylinder until reaching a selected track between the wheels 16. The bolts in the bores 214 and 216 are tightened to clamp the axle sleeve within the cylinder 210.

Figure 7:
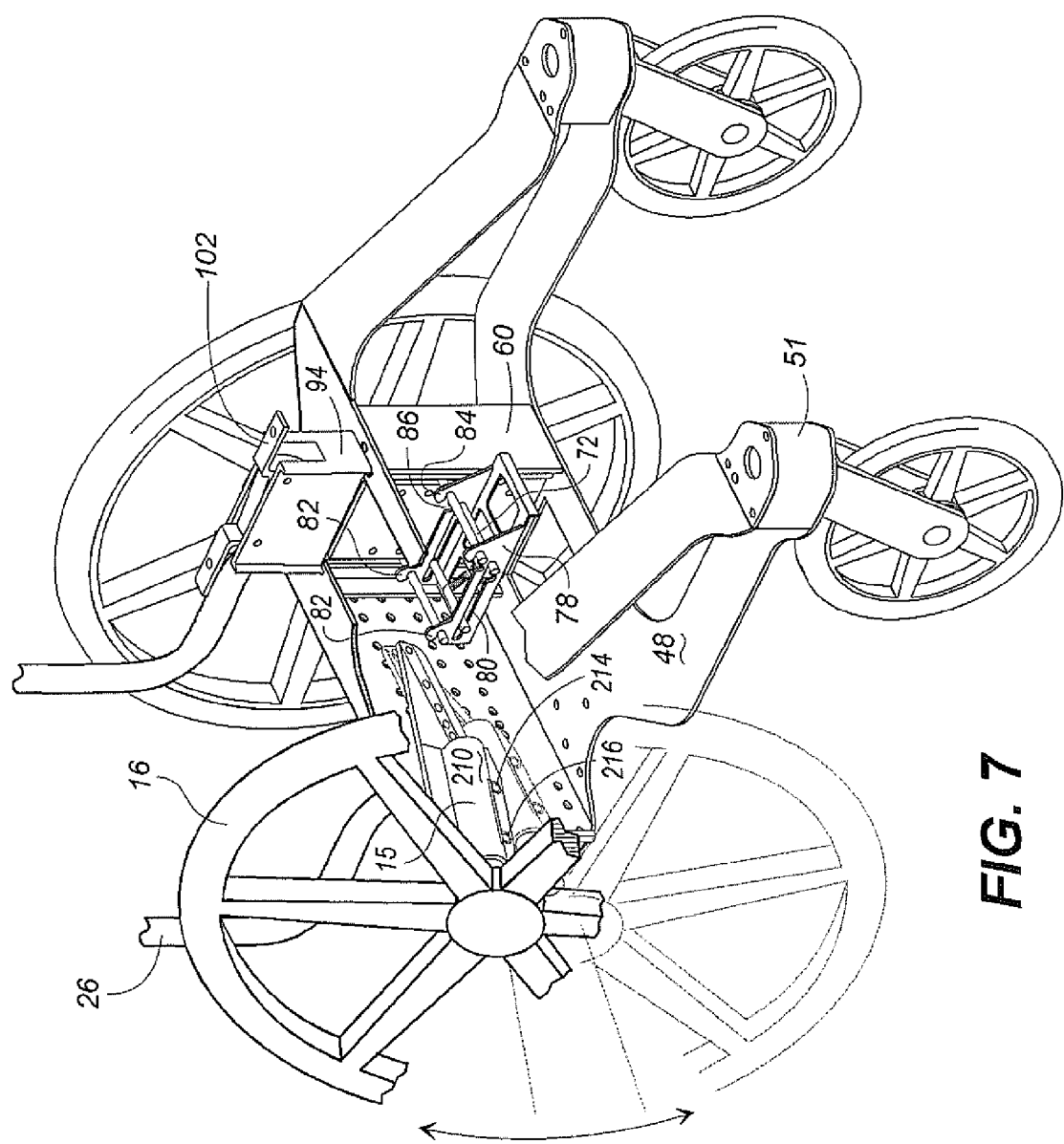
FIG. 7 is a cut-away perspective view detailing the axle mount and seat support for the wheelchair illustrated in FIG. 1.

The camber of the wheels 16 is adjustable independently and discussed below with reference to FIGS. 2, 6 and 7. The axle mounts 15 attach to the chassis back 42 at three points. First, a bolt extends through one of the openings 58, depending on the selected height for the wheels 16 for the wheelchair 10, through the open pivot bore 214, and into secure engagement with a nut. Second, a nut (not illustrated) is placed in the channel 222. A bolt is selectively inserted through one of the openings 56 and through the aligned one of the openings 226 depending upon the desired angle of camber for the wheel 16. For example, the bolt is inserted through hole 56a for a 12° of camber. The openings 56a, b, c, d, and e provide 12, 9, 6, 3, and 0 degrees of camber, respectively. Third, a bolt extends through one of the openings 57, through the slot 218, and into engagement with a nut. The bolts are tightened to secure the axle mount 15 to the chassis back 42.

The camber is adjusted by loosening the bolts in the pivot bore 214 and the slot 218. The bolt in the opening 226 is removed. The nut in the channel 222 is moved to the selected camber opening 226a, b, c, d, or e. The bolt is re-inserted through the selected camber opening 56, and engaged to the nut in the channel 222. The bolts in the bores 58, 214, the bore 57 and the slot 218, and the bores 56, 226 are tightened to secure the axle mount 15 at the selected camber.

The wheelchair 10 according to the present invention accommodates growth of the person who must rely on such for mobility. The wheelchair 10 is readily configured for use with stroller wheels using an axle mount 15 that does not include the flange 220. The openings 53 in the lower chassis 38 align with the bore 214, the slot 218 and the bore 216 in the axle mount 15 for attaching the axle mount to the underside of the chassis 12 for receiving an axle from a stroller wheel. The quick-release axle sleeve is received in the cylinder 210 and locked by securing the bolts in the bores 214 and 216. At an appropriate time after the child has grown, the stroller wheels are removed and drive wheels 16 added. The axle mount 15 is then moved to the chassis back 42 for receiving the quick-release wheel 16, as discussed above.

With reference to FIG. 8, the caster wheels 14 are selectively locked to restrain rotation about the castor block 51. The cam lever 255 is rotated from a first position with a flat 255a bearing on the arm 48 to a second position with a flat 255b bearing against the arm 48. With the cam lever 255 in the first position, the spring 253 bears on the flange 252 and pushes the tip 257 of the pin 251 into engagement with the slot 258 in the circular flange of the caster wheel 14. As the cam lever 255 moves to the second position, the pin 251 is retracted from the slot 258 and moves upwardly within the caster block 51. The flats 255a and 255b hold the pin 251 in the engaged and disengaged positions, respectively.

With reference to FIGS. 1 and 9, the wheelchair 10 can be held from easily being moved by actuating the wheel lock 259. The handle 280 is grasped and pushed away from the drive wheel 16. This causes the arm 286 to pivot downwardly about the pivot pin 288. The dowel pin 290 thereby moves downwardly and into engagement with the tire on the drive wheel 16. The wheel lock 259 is released by pulling the handle 280 towards the drive wheel 16 and thereby causing the arm 286 to pivot upwardly and bring the dowel pin 290 away from engagement with the drive wheel.

The benefits of the improved wheelchair may be gained with conventional tubular wheelchairs by attaching flat plates to the tubes of the frame for receiving the subassemblies disclosed herein, although in a preferred embodiment, the wheelchair 10 includes the chassis 12 according to the present invention. Manufacturing the frame 12 in a standard size accommodates the many different size combinations of seats and backs, rather than constructing a specific frame for each different combination. In an alternate embodiment, a drive motor attaches to the chassis back 42 and operatively connects to the drive wheels 16 for propelling the wheelchair 10. It is to be appreciated that the chassis 12, the frame columns 60, and the caster blocks 51 may be integrally formed by casting or molding. Similarly, other of the components for the wheelchair 10, such as the seat back 17, the seat frame 120, and the axle mounts 15, can be formed by casting or molding.

The specification has thus described in various embodiments the wheelchair of the present invention including the manufacture and use thereof. It is to be understood, however, that numerous changes and variations may be made in the construction of the present invention. It should therefore be understood that modifications to the present invention may be made without departing from the scope thereof as set forth in the appended claims.

What is claimed is:

1. A wheelchair, comprising:
a chassis having a planar lower chassis and a planar upper chassis immovably joined by a chassis back, two planar upper arms extending from the upper chassis and two planar lower arms extending longitudinally from the lower chassis, one of said upper arms and one of said lower arms converging to define a first pair of arms, the other of said upper arms and the other of said lower arms converging to define a second pair of arms, and a pair of caster wheels each pivotally mounted to a respective first pair or second pair of arms at distal ends thereof;
a seat attached to the planar upper chassis for supporting a person; and
a pair of wheels attached to the chassis.

2. The wheelchair as recited in claim 1, further comprising a pair of axle mounts for selective attachment to the chassis back or to the lower chassis, whereby the wheelchair is configured to receive stroller wheels when the axle mounts are attached to the lower chassis and is configured to receive drive wheels when the axle mounts are attached to the chassis back.

3. The wheelchair as recited in claim 2, further comprising means for selectively adjusting an angle of camber of the drive wheels.

4. The wheelchair as recited in claim 3, wherein the camber angle adjust means comprises:
the chassis back defining a plurality of camber-set bores; and
fasteners for connecting each axle mount to a selected one of the camber-set bores.

5. The wheelchair as recited in claim 2, further comprising means for selectively adjusting a track between the drive wheels.

6. The wheelchair as recited in claim 5, wherein the track adjust means comprises:
a split-side cylinder in each axle mount for receiving an axle sleeve that engages an axle of each drive wheel;
flanges extending laterally of the split-side cylinder and defining bores for receiving fasteners; and
fasteners for closing the split-side cylinder together to secure the axle sleeve within the cylinder,
whereby the track is selectively set by slidably positioning the axle sleeve within the cylinder.

7. The wheelchair as recited in claim 2, further comprising means for adjusting a height of the chassis relative to a rolling surface on which the wheelchair moves.

8. The wheelchair as recited in claim 7, wherein the height adjust means comprises at least two sets of vertically spaced bores on the chassis back for mounting the axle mounts at selected heights.

9. The wheelchair as recited in claim 1, further comprising:
a pair of frame columns that extend between the lower chassis and the upper chassis; and
a pair of parallel spaced-apart seat columns slidably received in the frame columns and attached to the seat.

10. The wheelchair as recited in claim 9, further comprising means for adjusting an angle of the seat relative to the seat columns.

11. The wheelchair as recited in claim 10, wherein the means for adjusting the angle of the seat comprises a pair of seat connectors, each pivotally attached to a respective one of the seat columns and attached to the seat and means for securing the seat connectors at a selected angle.

12. The wheelchair as recited in claim 9, further comprising means for adjusting an elevation of the seat columns.

13. The wheelchair as recited in claim 12, wherein the elevation adjusting means comprises support pins that selectively insert into one of a plurality of aligned spaced-apart openings in each frame column.

14. The wheelchair as recited in claim 9, wherein the seat comprises a seat frame that attaches to a cushion for seating a person thereon and a seat back extending from the seat frame at an angle thereto.

15. The wheelchair as recited in claim 14, further comprising means for adjusting an angle of the seat back relative to the seat frame.

16. The wheelchair as recited in claim 14, further comprising means for adjusting a position of the seat frame relative to the chassis back, whereby a balance of the wheelchair is selectively adjustable.

17. The wheelchair as recited in claim 16, wherein the seat frame defines a pair of elongated slots; and further comprising fasteners that extend through the slots and connect to the seat cushion, whereby the seat frame is selectively positioned relative to the chassis back by moving the seat frame along the slots.

18. The wheelchair as recited in claim 9, further comprising means for adjusting a position of a cushioned seat engaged to a seat connector.

19. The wheelchair as recited in claim 18, wherein the seat adjust means comprises:
a pair of slots in a frame for the seat; and
fasteners extending through the pair of slots for engaging the cushioned seat, whereby the cushioned seat is selectively positioned by sliding the fasteners along the pair of slots.

20. The wheelchair as recited in claim 1, further comprising a caster block attached between the opposed distal ends of the upper arm and the lower arm in each of the pair of arms, the caster block comprising:
a housing having a central bore therethrough and a plurality of spaced-apart bores for receiving bolts for attaching the housing to the distal ends of the upper arm and the lower arm;
a resilient core received in the central bore and defining an axial bore for receiving therethrough a shaft of the caster wheel, the distal ends of the core defining recesses;
a pair of bearing races received in the recesses,
whereby the shaft of the caster wheel, being extended through the axial bore in the core, engages the caster wheel to the caster block; and
a fastener to engage the shaft of the caster wheel.

21. A wheelchair, comprising:
a chassis having a planar lower chassis and a planar upper chassis joined by a chassis back, two upper arms extending from the upper chassis and two lower arms extending longitudinally from the lower chassis, one of said upper arms and one of said lower arms converging to define a first pair of arms, the other of said upper arms and the other of said lower arms converging to define a second pair of arms, and a pair of caster wheels each pivotally mounted to a respective first pair or second pair of arms at distal ends thereof;
a pair of frame columns that extend between the lower chassis and the upper chassis;
a pair of spaced-apart seat columns detachably slidably received in the frame columns and attached to a seat for supporting a person thereon, whereby the seat is selectively positioned in the wheelchair for use of the wheelchair for mobility of a person and removed therefrom for transportation of the wheelchair; and
a pair of axle mounts for selective attaching to the chassis back or to the lower chassis, whereby the wheelchair is configured to receive stroller wheels when the axle mounts are attached to the lower chassis and is configured to receive drive wheels when the axle mounts are attached to the chassis back.

22. The wheelchair as recited in claim 21, further comprising means for selectively adjusting an angle of camber of the drive wheels.

23. The wheelchair as recited in claim 21, further comprising means for selectively adjusting a track between the drive wheels.

24. The wheelchair as recited in claim 21, further comprising means for adjusting a height of the chassis relative to a rolling surface on which the wheelchair moves.

25. The wheelchair as recited in claim 21, further comprising means for adjusting an elevation of the seat columns.

26. The wheelchair as recited in claim 21, wherein the seat comprises a seat frame that receives a cushion for seating a person thereon and a seat back extending from the seat frame at an angle thereto.

27. The wheelchair as recited in claim 26, further comprising means for adjusting an angle of the seat back relative to the seat frame.

28. The wheelchair as recited in claim 26, further comprising means for adjusting a position of the seat frame relative to the chassis back, whereby a balance of the wheelchair is selectively adjustable.

\* \* \* \* \*